United States Patent
Macpherson et al.

(10) Patent No.: US 6,606,224 B2
(45) Date of Patent: Aug. 12, 2003

(54) CARTRIDGE BEARING WITH FRICTIONAL SLEEVE

(75) Inventors: Aaron Steve Macpherson, Fort Collins, CO (US); Rick K. Thompson, Longmont, CO (US); Gary F. Kelsic, Longmont, CO (US); Robert A. Alt, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 186 days.

(21) Appl. No.: 09/795,596

(22) Filed: Feb. 28, 2001

(65) Prior Publication Data

US 2002/0118490 A1 Aug. 29, 2002

Related U.S. Application Data

(60) Provisional application No. 60/246,169, filed on Nov. 6, 2000.

(51) Int. Cl.$^7$ .................................................. G11B 5/55
(52) U.S. Cl. ................................................... 360/265.6
(58) Field of Search .......................... 360/266.1, 265.4, 360/265.6

(56) References Cited

U.S. PATENT DOCUMENTS

| | | | | |
|---|---|---|---|---|
| 5,146,450 A | * | 9/1992 | Brooks et al. | 369/244 |
| 5,473,489 A | * | 12/1995 | Sanada | 360/265.6 |
| 5,666,242 A | * | 9/1997 | Edwards et al. | 360/265.6 |
| 5,675,456 A | * | 10/1997 | Myers | 360/265.6 |
| 5,818,665 A | | 10/1998 | Malagrino, Jr. et al. | |
| 5,828,521 A | | 10/1998 | Hasegawa | |
| 5,914,837 A | * | 6/1999 | Edwards et al. | 360/265.6 |
| 6,288,879 B1 | * | 9/2001 | Misso et al. | 360/265.6 |

FOREIGN PATENT DOCUMENTS

| | | | |
|---|---|---|---|
| JP | 2000-48497 A | * | 2/2000 |
| JP | 2000-149471 A | * | 5/2000 |

* cited by examiner

*Primary Examiner*—Jefferson Evans
(74) *Attorney, Agent, or Firm*—Derek J. Berger

(57) ABSTRACT

The outer surface of the cartridge sleeve is provided with features which increase the frictional coefficient between the cartridge sleeve and a tolerance ring placed around the cartridge. The cartridge and ring are then press-fit into the actuator bore together. The increased friction between the cartridge and ring prevents slip between them, eliminating the need to increase compressive forces between the ring and the bore and bearing.

11 Claims, 4 Drawing Sheets

CARTRIDGE BEARING WITH FRICTIONAL SLEEVE

CROSS REFERENCE TO RELATED APPLICATIONS

This application claims the benefit of U.S. Provisional Application No. 60/246,169, filed Nov. 6, 2000.

FIELD OF THE INVENTION

This invention relates generally to the field of hard disc drive data storage devices, and more particularly, but not by way of limitation, to rotational movement of disc drive actuators.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 15,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative pneumatic relationship with a thin layer of air dragged along by the spinning discs to fly the head assembly in a closely spaced relationship to the disc surface. In order to maintain the proper flying relationship between the head assemblies and the discs, the head assemblies are attached to and supported by flexures attached to the actuator.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. The actuator is mounted to the pivot shaft by precision ball bearing assemblies within a bearing housing. The actuator supports a flat coil which is suspended in the magnetic field of an array of permanent magnets, which are fixedly mounted to the disc drive housing base member. These magnets are typically mounted to pole pieces which are held in positions vertically spaced from another by spacers at each of their ends.

On the side of the actuator bearing housing opposite to the coil, the actuator assembly typically includes a plurality of vertically aligned, radially extending actuator head mounting arms, to which the head suspensions mentioned above are mounted. These actuator arms extend between the discs, where they support the head assemblies at their desired positions adjacent the disc surfaces. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved generally radially across the data tracks of the discs along an arcuate path.

As explained above, the actuator assembly typically includes an actuator body that pivots about a pivot mechanism disposed in a medial portion thereof. The function of the pivot mechanism is crucial in meeting performance requirements associated with the positioning of the actuator assembly. A typical pivot mechanism has two ball bearings with a stationary shaft attached to an inner race and a sleeve attached to an outer race. The sleeve is also secured within a bore in the actuator body. The stationary shaft typically is attached to the base deck and the top cover of the disc drive.

Bearing cartridges have been mounted within actuator bores in a variety of ways. Some have simply press-fit the cartridge into the bore; others have formed the bore of the actuator of plastic in order to facilitate such press-fitting. Still others have provided screws in the actuator body which extend into the bore, either to serve as set screws pressing against the cartridge sleeve or to engage threads in the cartridge sleeve so as to pull the cartridge into tight contact with the bore. However, all of these methods present additional problems: simple press-fitting risks damage to both the bore and cartridge; plastic bores are subject to thermal expansion and contraction, as well as fatigue; and providing screws and their bores requires additional parts, manufacturing steps and costs.

One solution to these problems has been to provide a groove in the outer surface of the sleeve, and then positioning a tolerance ring within the groove. The tolerance ring is typically made of a compressible yet resilient piece of material such as a corrugated steel sheet. The bearing cartridge and tolerance ring assembly is then press-fit into the bore of the actuator body, the tolerance ring holding the cartridge in place within the bore while yielding enough so that neither the cartridge nor the bore is damaged as a result of the press-fitting operation. This method has proven largely satisfactory.

However, even this arrangement raises other problems. The bearing and tolerance ring are typically made of steel because of its high strength. The actuator bore's inner surface is typically made of aluminum because of its relatively low weight and cost. Aluminum is a much softer material than steel, so when the bearing cartridge and tolerance ring are pressed into the actuator bore, the steel corrugations tend to "bite" into the soft aluminum bore by mildly deforming the aluminum, resulting in a high level of friction between the ring and bore. Because the bearing cartridge is made of steel, however, there is little between the cartridge and ring to create friction between them. This greatly raises the risk of axial slippage between the bearing cartridge and the tolerance ring during shock events. In fact, tests have borne this out, indicating that slip between the ring and the cartridge occurs at about a mere 20% of the force required to cause slip between the ring and actuator bore.

In order to prevent slip between the cartridge and tolerance ring, then, it has generally been necessary to increase assembly forces to a very high degree. The result has been that slip between the cartridge and tolerance ring has been eliminated, by creating a tighter fit between the bore, ring and cartridge. The extremely tight fit has the added effects of making assembly more problematic, raising the risk of cartridge or actuator damage, and also results in frictional forces between the ring and bore far in excess of what is necessary to prevent slip between them.

What the prior art has been lacking is a bearing cartridge mounting arrangement which is easily assembled but which is resistant to slip when subject to axial forces.

SUMMARY OF THE INVENTION

The present invention is directed to an easily assembled bearing cartridge mounting arrangement. Prior to installing a bearing cartridge in an actuator bore, a tolerance ring is placed around the cartridge. The outer surface of the cartridge sleeve is provided with features which increase the frictional coefficient between the cartridge sleeve and the tolerance ring. The cartridge and ring are then press-fit into the actuator bore together. The increased friction between the cartridge and ring prevents slip between these two components, eliminating the need to increase compressive forces between the ring and the bore and bearing. Additional features and benefits will become apparent upon a review of the attached figures and the accompanying description.

DETAILED DESCRIPTION OF THE INVENTION

Figure 1:
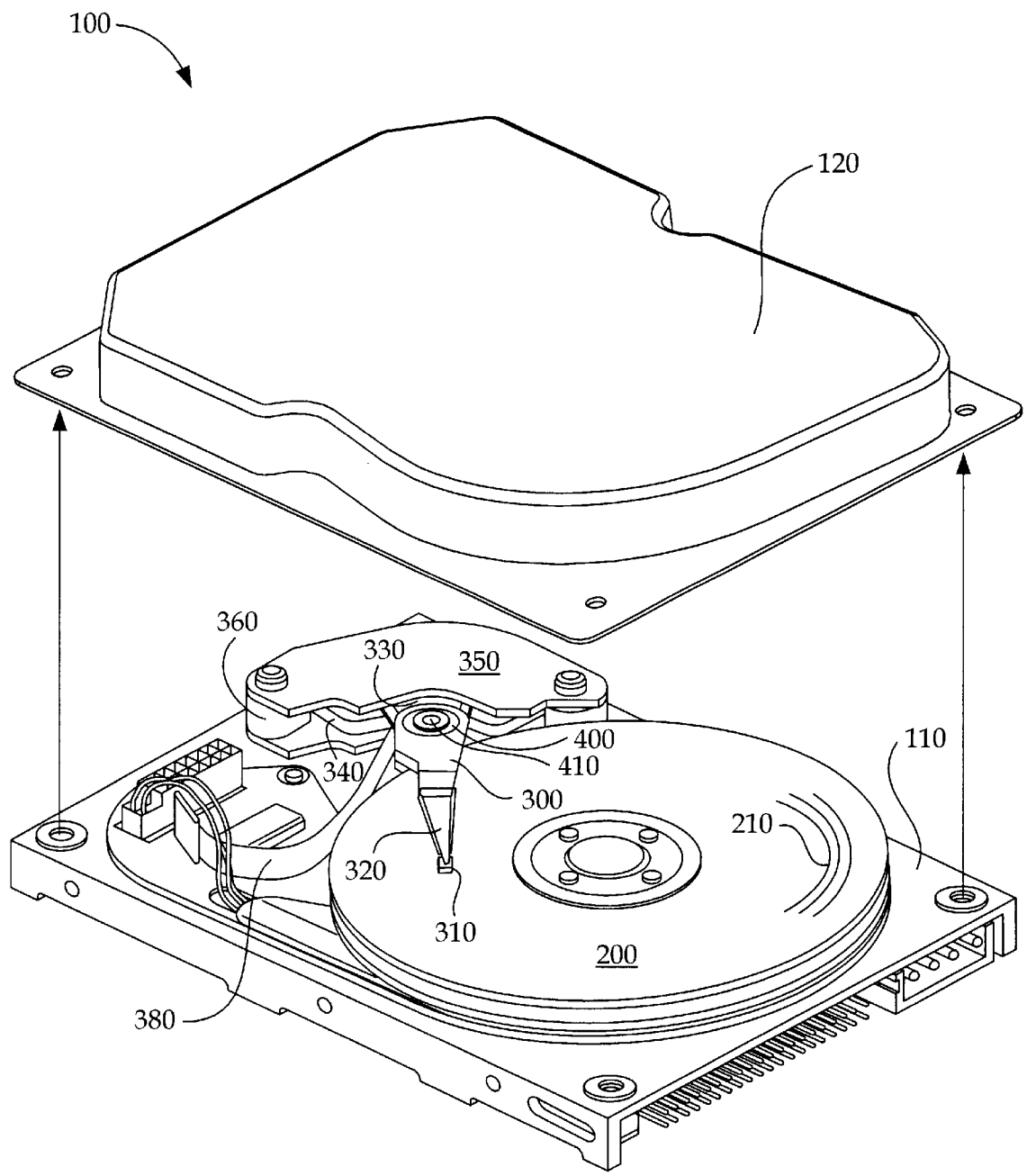
FIG. 1 shows an exploded view of a disc drive incorporating the bearing mounting assembly of the present invention.

Turning now to the drawings and specifically to FIG. 1, shown is an exploded view of an example of a disc drive 100 in which the present invention is particularly useful. The disc drive 100 includes a deck 110 to which all other components are directly or indirectly mounted and a top cover 120 which, together with the deck 110, forms a disc drive housing which encloses delicate internal components and isolates these components from external contaminants.

The disc drive 100 includes a plurality of discs 200 which are mounted for rotation on a spindle motor (not shown). The discs 200 include on their surfaces a plurality of circular, concentric data tracks 210 on which data are recorded via an array of vertically aligned head assemblies (one of which is shown at 310). The head assemblies 310 are supported by flexures 320, which are attached to arm portions of actuator 300. The actuator 300 is mounted to a bearing assembly 400 which includes a stationary pivot shaft 410 about which the actuator 300 rotates.

Power to drive the actuator 300 about the pivot shaft 410 is provided by a voice coil motor (VCM). The VCM consists of a coil 330 which is supported by the actuator 300 within the magnetic field of a permanent magnet assembly having spaced upper and lower magnets 340. The magnets 340 are mounted to spaced pole pieces 350 which are fixed to the deck 110 and are further spaced from one another by spacers 360. Electronic circuitry is provided on a printed circuit board (PCB, not shown) mounted to the underside of the deck 110. Control signals to drive the VCM are carried between the PCB and the moving actuator 300 via a flexible printed circuit cable (PCC) 380, which also transmits data signals to and from the heads 310.

Figure 2:
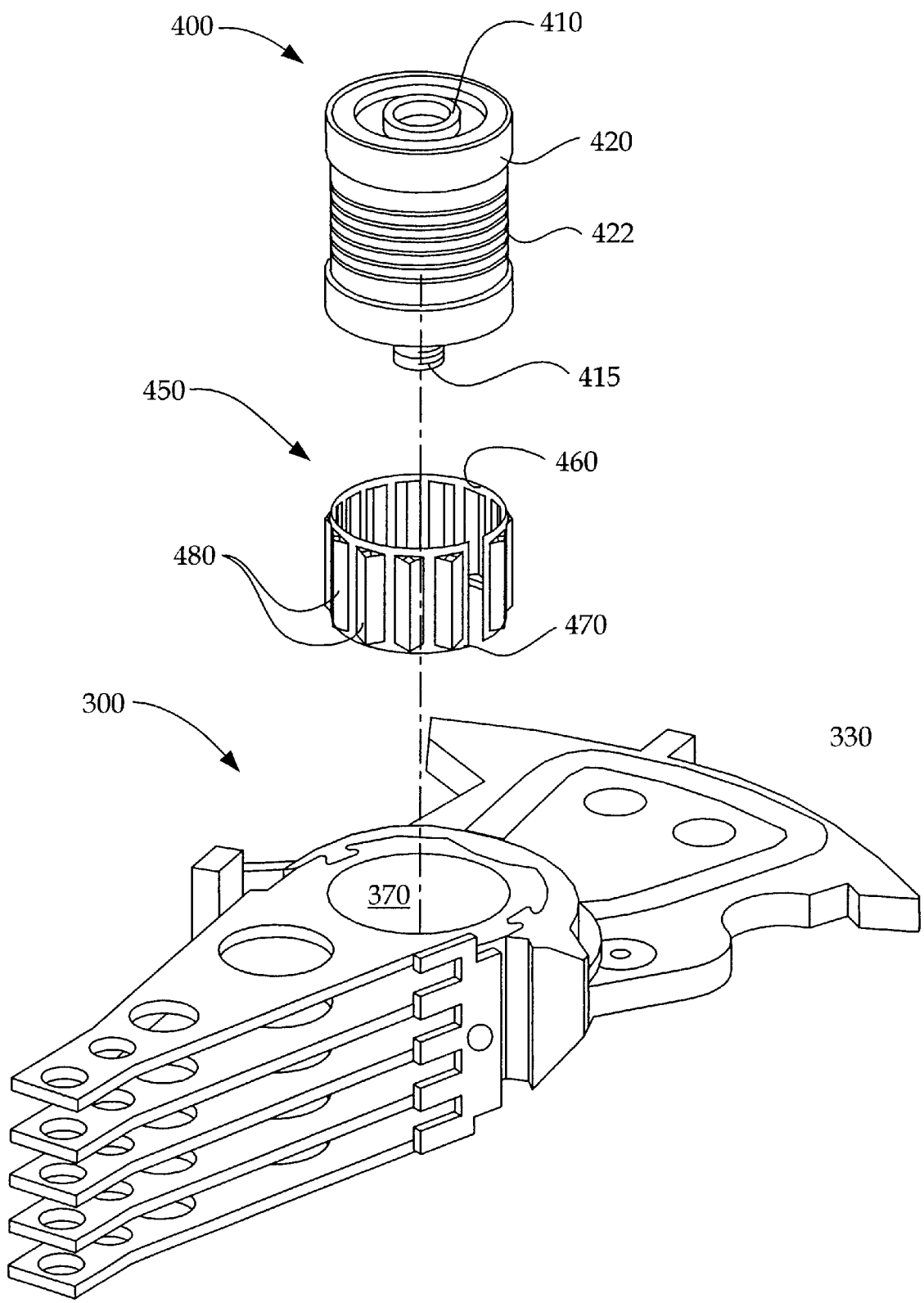
FIG. 2 shows an exploded view of an actuator incorporating the bearing mounting assembly of the present invention.

FIG. 2 shows a partially exploded, perspective view of an actuator 300 incorporating the bearing assembly of the present invention. The actuator 300 has a bore 370 formed therethrough which receivingly engages a bearing assembly. The bearing assembly is shown to include a bearing cartridge 400 and a tolerance ring 450 compressingly interposed between the bearing cartridge 400 and the bore 370 to retain the bearing cartridge 400 within the bore 370. The cartridge 400 and the tolerance ring 450 are installed by first placing the tolerance ring 450 around the cartridge 400, and then axially inserting the cartridge-ring assembly into the actuator bore 300.

Figure 3:
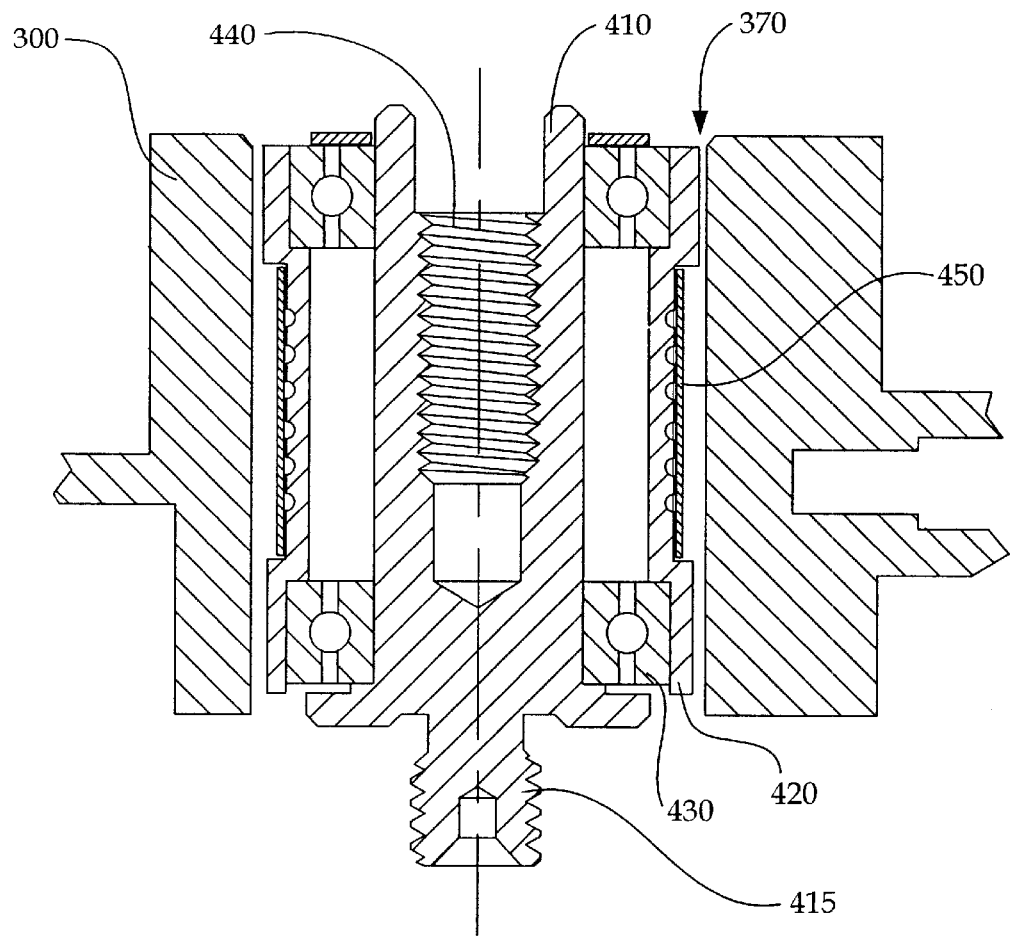
FIG. 3 depicts a cross-sectional view of a bearing mounted within an actuator.

FIG. 3 shows a cross-sectional view of the actuator 300 with the bearing cartridge 400 and the tolerance ring 450 installed in actuator bore 370. The cartridge 400 has a stationary pivot shaft 410 which has a threaded projection 415 at its lower end for secure mounting to the floor of deck 110. The cartridge 400 also includes an outer sleeve 420 separated at upper and lower ends thereof by a pair of ball bearings 430. The stationary shaft 410 may also include an upper threaded opening 440 to receive a fastener (not shown) for attachment of the stationary shaft 410 to the top cover 120. It will be readily understood that the shaft 410 could be attached to the deck 110 and cover 120 by other means than those disclosed here without departing from the spirit of the present invention. In this manner it will be understood that the stationary shaft 410 is rigidly supported and the sleeve 420 is free to rotate about the stationary shaft 410. The sleeve 420 of the bearing cartridge 400 forms an upper shoulder, a lower shoulder, and a groove of a reduced diameter between the shoulders. The tolerance ring 450 is seated in the groove before the bearing cartridge 400 is placed into the bore 370. It should be understood that the width of ring 450 is actually shorter then the width of the groove for ease of assembly.

As can be seen in FIG. 2, the tolerance ring 450 is typically a split ring member which forms a cylindrical inner surface 460 and a cylindrical outer surface 470, with a plurality of projecting corrugations 480 forming a corrugated surface on the outer surface 470. Such tolerance rings are well-known, for a variety of purposes, and examples of such rings are those manufactured by USA Tolerance Ring.

Figure 4:
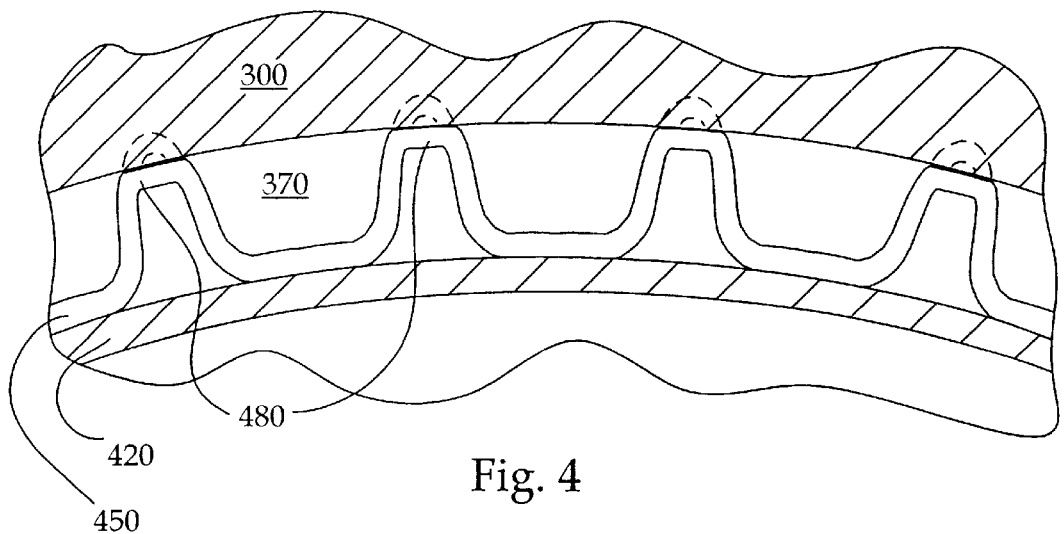
FIG. 4 shows a cross-sectional view of a tolerance ring sandwiched between a bearing cartridge and actuator bore.

It will be understood from FIG. 4 that the tolerance ring 450 is sandwiched between the groove of the sleeve 420 and the surface of the bore 370 of the actuator 300. The sleeve 420 and tolerance ring 450 combine to provide an effective outer diameter that is greater than the diameter of bore 370. As such, the sleeve 420 and tolerance ring 450 combination can be press fit into the bore 370. The press-fit compresses the corrugations 480 as shown in FIG. 4 where the broken lines denote the shape of the corrugations 480 before insertion into the bore 370. The compression imparted to the corrugations 480 of the tolerance ring 450 creates sufficient frictional resistance to retain the tolerance ring 450 within the bore 370, preventing displacement of the tolerance ring 450 relative to the actuator in both the axial and radial directions.

The frictional resistance between the tolerance ring 450 and the actuator bore 370 is greater than that between the ring 450 and cartridge sleeve 420. This is primarily because the corrugations 480 of the ring 450, which are made of steel, actually "bite" into the softer aluminum from which the actuator bore 370 is formed. The bearing cartridge sleeve 420, however, is made of steel, and much less frictional resistance is created between the machined surface of the sleeve 420 and the inner surface 460 of the tolerance ring 450. It follows that even when the tolerance ring 450 is securely axially located within the bore 370, slippage may occur nonetheless between the cartridge 400 and the tolerance ring 450 if measures are not taken to prevent it. It is for this reason that frictional elements are provided on the outer surface of the cartridge sleeve 420.

Figure 5:
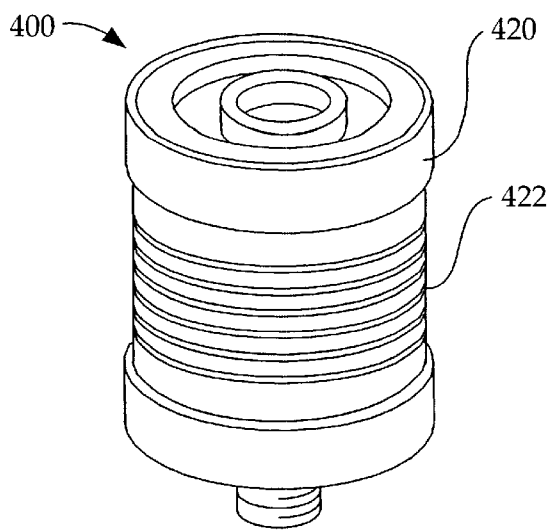
FIG. 5 shows a cartridge with grooves formed in the sleeve.

One embodiment of the present invention is illustrated in FIGS. 2, 3 and 5, in which circumferential horizontal grooves 422 are provided in the outer surface of the cartridge sleeve 420. Machining these grooves 422 creates edges and recesses which effectively "bite" into the inner surface 460 of the tolerance ring 450, reducing the likelihood of slippage therebetween without unnecessarily increasing the frictional resistance between the ring 450 and the actuator bore 370. Because the outer surface of the cartridge sleeve 420 is typically turned to precise specifications anyway, the grooves 422 can machined at the same time. This is advantageous in that manufacturing costs are not significantly increased by providing grooves 422 in the sleeve 420. Grooves 422 are also easily inspected to ensure they are in conformance with tolerances and specifications. The horizontal orientation of the grooves 422 is particularly effective in preventing axial slippage between the cartridge 400 and sleeve 450.

Figure 6:
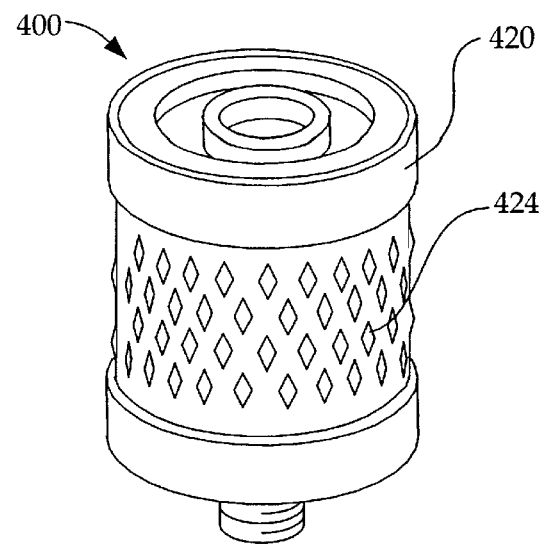
FIG. 6 shows a cartridge with knurling formed in the sleeve.

FIG. 6 shows another embodiment of the invention in which the outer surface of the sleeve 420 is knurled 424. Again, knurling 424 provides a large number of edges and recesses which allow the sleeve 420 to "bite" into the inner surface 460 of the tolerance ring 450. Knurling 424 has the added advantage of effectively preventing rotational slippage in addition to axial slippage. While rotational slippage is far less likely than axial slippage, given that cartridge sleeve 420 is free to rotate about pivot shaft 410, it is conceivable that in some applications a severe rotational shock event might cause rotational slippage in the absence of frictional elements 424.

Figure 7:
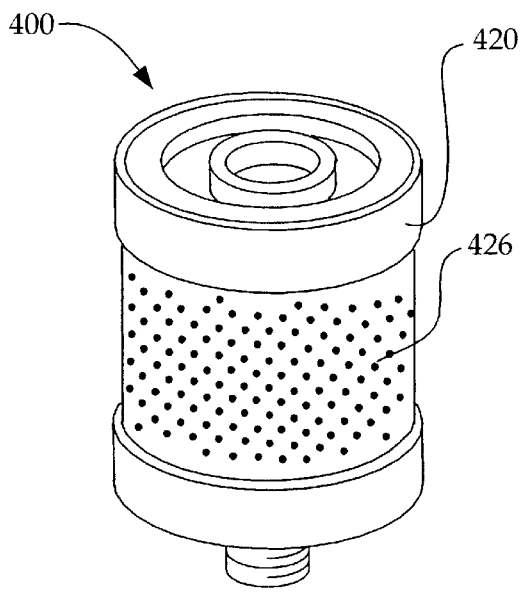
FIG. 7 shows a cartridge with adhesive placed on the sleeve.

FIG. 7 shows another embodiment of the invention in which the outer surface of the sleeve 420 is provided with adhesive 426. Adhesive 426 provides a sticky surface on the cartridge sleeve 420 to which the tolerance ring 450 may bond, so as to prevent both axial and rotational slippage between the ring 450 and sleeve 420.

Figure 8:
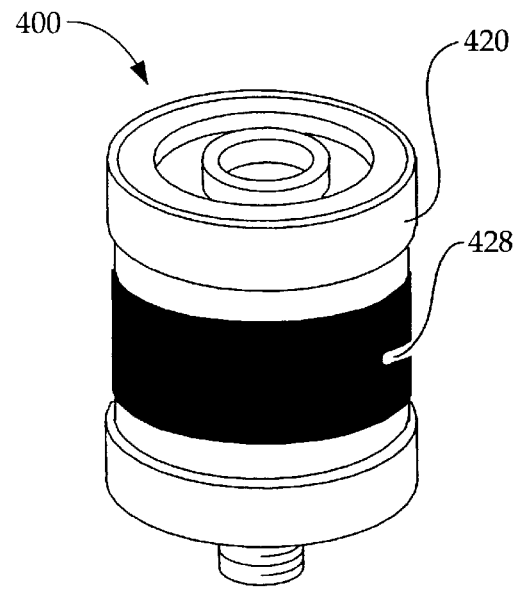
FIG. 8 shows a cartridge with resilient material placed on the sleeve.

FIG. 8 shows yet another embodiment of the invention in which the outer surface of the sleeve 420 is provided with a layer of resilient material 428. The resilient material 428 may be rubber, plastic, or any other similar material that provides a soft surface into which the inner surface 460 of the tolerance ring 450 may "bite", so as to prevent both axial and rotational slippage between the ring 450 and sleeve 420.

Of course, it should be understood that a bearing cartridge mounting arrangement may differ from the example described above without departing from the spirit of the claimed invention. For example, while frictional elements are discussed above with respect to a corrugated tolerance ring, they could of course be used with other mounting systems in which enhanced friction with respect to the bearing cartridge is desirable. Moreover, other friction-enhancing methods could be provided in lieu of or in combination with those discussed above. For example, bead blasting, sanding, or other methods could be use to provide a rough surface in order to increase friction.

Alternatively stated, a first contemplated embodiment of the invention is an mounting assembly for an actuator 300 including a bearing cartridge 400 having a shaft 410 and a sleeve 420 rotatable about the shaft 410. The cartridge 400 is configured to be positioned in a bore 370 within the actuator 300. The assembly further includes a retention element 450 configured to be positioned between the sleeve 420 and a surface of the bore 370. The assembly further includes at least one feature positioned between the shaft 410 and the retention element 450 configured to prevent relative movement between the sleeve 420 and the retention element 450. Optionally, the retention element 450 may be a corrugated sheet 450. As another option, the movement preventing feature may be a groove 422 in the sleeve 420. As yet a further option, the movement preventing feature may be a plurality of grooves 422 extending about a periphery of the sleeve 420. As another option, the movement preventing feature may be adhesive material 426 located on the sleeve 420.

Alternately characterized, a second comtemplated embodiment of the invention is a disc drive 100 having a housing 110, an actuator 300 having a bore 370 therein, and a bearing cartridge 400 fixed to the housing 110 and positioned within the actuator bore 370. The cartridge has an axis of rotation. A resilient element 450 is positioned between the cartridge 400 and a surface of the bore 370. The disc drive further includes at least one frictional element associated with the cartridge 400 and contacting the resilient element 450 so as to prevent all axial movement of the actuator 300 relative to the cartridge 400. Optionally, the resilient element 450 may be a tolerance ring. As another option, the frictional element may be a knurled projection 424 located on the sleeve. As yet another option, the frictional element may be a resilient member 428 affixed to the sleeve.

From the foregoing, it is apparent that the present invention is particularly suited to provide the benefits described above. While particular embodiments of the invention have been described herein, modifications to the embodiments which fall within the envisioned scope of the invention may suggest themselves to one of skill in the art who reads this disclosure.

We claim:

1. An actuator mounting assembly, comprising:
   a bearing cartridge having a shaft and a sleeve rotatable about the shaft, the cartridge being configured to be positioned in a bore within the actuator;
   a retention sheet configured to be positioned between the sleeve and a surface of the bore; and
   at least one feature positioned between the shaft and the retention sheet configured to prevent relative movement between the sleeve and the retention sheet.

2. The mounting assembly of claim 1, in which the retention sheet is corrugated.

3. The mounting assembly of claim 1, the at least one feature comprising a groove formed in the sleeve.

4. The mounting assembly of claim 1, the at least one feature comprising a plurality of grooves extending about a periphery of the sleeve.

5. The mounting assembly of claim 1, the at least one feature comprising an adhesive located on the sleeve.

6. The mounting assembly of claim 1, in which the retention sheet substantially surrounds the cartridge.

7. A disc drive, comprising:
   a housing;
   an actuator having a bore therein;
   a bearing cartridge fixed to the housing and positioned within the bore, the cartridge having an axis of rotation;
   a resilient element positioned between the cartridge and a surface of the bore; and
   at least one frictional element associated with the cartridge and contacting the resilient element so as to prevent all axial movement of the actuator relative to the cartridge.

8. The disc drive of claim 7, the resilient element comprising a tolerance ring.

9. The disc drive of claim 7, the at least one frictional element comprising a knurled projection located on the sleeve.

10. The disc drive of claim 7, the at least one frictional element comprising a resilient member affixed to the sleeve.

11. A disc drive comprising:
    a bearing cartridge;
    an actuator connected to the cartridge so as to be rotatable about an axis; and
    means for restricting axial movement of the actuator relative to the cartridge.

* * * * *